US009783010B2

(12) United States Patent
Naruse (10) Patent No.: US 9,783,010 B2
(45) Date of Patent: Oct. 10, 2017

(54) TIRE CONDITION MONITORING SYSTEM AND TIRE CONDITION MONITORING DEVICE

(71) Applicant: The Yokohama Rubber Co., LTD., Minato-ku, Tokyo (JP)

(72) Inventor: Masahiro Naruse, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 293 days.

(21) Appl. No.: 14/410,564

(22) PCT Filed: Oct. 24, 2013

(86) PCT No.: PCT/JP2013/078880
§ 371 (c)(1),
(2) Date: Dec. 22, 2014

(87) PCT Pub. No.: WO2014/069338
PCT Pub. Date: May 8, 2014

(65) Prior Publication Data
US 2015/0336433 A1 Nov. 26, 2015

(30) Foreign Application Priority Data
Oct. 31, 2012 (JP) .................. 2012-241162

(51) Int. Cl.
B60C 23/00 (2006.01)
B60C 23/04 (2006.01)
G08C 17/02 (2006.01)

(52) U.S. Cl.
CPC ........ B60C 23/0433 (2013.01); B60C 23/007 (2013.01); B60C 23/008 (2013.01);
(Continued)

(58) Field of Classification Search
CPC ............................ B60C 23/0433; B60C 23/00
(Continued)

(56) References Cited

U.S. PATENT DOCUMENTS 6,954,687 B2 * 10/2005 Taguchi .............. B60C 23/0466
340/447
6,967,570 B2 * 11/2005 Tsuji ................... B60C 23/0466
340/442

(Continued)

FOREIGN PATENT DOCUMENTS

DE    102 20 083    11/2003
DE    103 17 597    11/2004
(Continued)

OTHER PUBLICATIONS

International Search Report for International Application No. PCT/JP2013/078880 dated Jan. 21, 2014, 6 pages, Japan.

(Continued)

*Primary Examiner* — Toan N Pham
(74) *Attorney, Agent, or Firm* — Thorpe North & Western (57) ABSTRACT

A tire condition monitoring system includes a plurality of tire condition acquisition devices that are installed on pneumatic tires and acquires quantities of tire conditions, and a monitoring device that receives a radio signal from each of the tire condition acquisition devices and performs a predetermined process. The monitoring device sequentially specifies tire labels of the tire condition acquisition devices and requests input of tire positions of the tire condition acquisition devices. The monitoring device generates registration information in which a sensor ID and a tire position are associated based on the input results of the tire position.

14 Claims, 10 Drawing Sheets

(52) U.S. Cl.
CPC ...... B60C 23/0401 (2013.01); B60C 23/0472 (2013.01); G08C 17/02 (2013.01)

(58) Field of Classification Search
USPC ............. 340/442, 445, 447; 73/146.2, 146.5, 73/146.8
See application file for complete search history.

(56) References Cited

U.S. PATENT DOCUMENTS

| | | | | |
|---|---|---|---|---|
| 7,839,270 | B2 * | 11/2010 | Shimura | ............... B60C 23/007 340/431 |
| 8,186,208 | B2 * | 5/2012 | Matsumura | ......... B60C 23/0408 73/146 |
| 2003/0205081 | A1 | 11/2003 | Proschka | |
| 2003/0227379 | A1 | 12/2003 | Itou | |
| 2005/0134445 | A1 | 6/2005 | Ogawa et al. | |
| 2005/0156720 | A1 | 7/2005 | Ogawa | |
| 2006/0016110 | A1 | 1/2006 | Nakatani et al. | |
| 2006/0017554 | A1 | 1/2006 | Stewart et al. | |
| 2007/0055411 | A1 | 3/2007 | Nihei et al. | |
| 2008/0164988 | A1 | 7/2008 | DeKeuster et al. | |
| 2009/0199629 | A1 | 8/2009 | Matsumura | |
| 2012/0013458 | A1 | 1/2012 | Kanenari | |
| 2012/0212334 | A1 | 8/2012 | Rigney | |

FOREIGN PATENT DOCUMENTS

| | | |
|---|---|---|
| DE | 10 2011 051 805 | 1/2012 |
| JP | 2002-321511 | 11/2002 |
| JP | 2004-174909 | 6/2004 |
| JP | 2004-314726 | 11/2004 |
| JP | 2005-170081 | 6/2005 |
| JP | 2005-199777 | 7/2005 |
| JP | 2005-321315 | 11/2005 |
| JP | 2007-216832 | 8/2007 |
| JP | 2008-074223 | 4/2008 |
| JP | 2009-184614 | 8/2009 |
| JP | 2010-125878 | 6/2010 |
| JP | 4764479 | 9/2011 |
| JP | 4857783 | 1/2012 |
| JP | 2012-126192 | 7/2012 |
| JP | 2012-148603 | 8/2012 |
| WO | WO 2004/091941 | 10/2004 |
| WO | WO 2006/113385 | 10/2006 |

OTHER PUBLICATIONS

Tire Condition Monitoring System and Tire Condition Monitoring Device, English translation of Office Action for JP 2012-241162 dated Jan. 27, 2015, Japan.

Tire Condition Monitoring System and Tire Condition Monitoring Device, English translation of Office Action for JP 2012-241162 dated Mar. 18, 2014, Japan.

Tire Condition Monitoring System and Tire Condition Monitoring Device, English translation of Office Action for JP 2012-241162 dated Aug. 19, 2014, Japan.

* cited by examiner

TIRE CONDITION MONITORING SYSTEM AND TIRE CONDITION MONITORING DEVICE

TECHNICAL FIELD

The present technology relates to a tire condition monitoring system and a tire condition monitoring device, and more particularly relates to a tire condition monitoring system and a tire condition monitoring device capable of simplifying an operation of updating registration information in which a sensor ID and a tire position of a tire condition acquisition device are associated.

BACKGROUND

Tire condition monitoring systems have conventionally been known which monitor quantities of or values representing tire conditions (e.g., air pressure, temperature, etc.) for pneumatic tires. A tire condition monitoring system is provided with a tire condition acquisition device which is disposed in a hollow portion of a pneumatic tire and acquires quantities of tire conditions (e.g., air pressure, and temperature) and a monitoring device which monitors quantities of tire conditions by receiving radio waves from the tire condition acquisition device.

If the tire positions in the tire condition acquisition device are moved because of tire rotation or the like, the registration information associating the sensor ID of the tire condition acquisition device and the tire positions has to be updated. It is, therefore, preferable to be able to easily update the registration information. Conventional tire condition monitoring systems related to this problem are disclosed in Japanese Patent Nos. 4764479B and 4857783B, as well as in Japanese Unexamined Patent Application Publication Nos. 2008-74223A and 2010-125878A.

SUMMARY

The present technology provides a tire condition monitoring system and monitoring device capable of simplifying updating of registration information in which a tire position and a sensor ID of a tire condition acquisition device are associated.

A tire condition monitoring system according to the present technology is a tire condition monitoring system including: a plurality of tire condition acquisition devices that are installed on pneumatic tires and acquire quantities of tire conditions; and a monitoring device that receives a radio signal from each of the tire condition acquisition devices and performs a predetermined process, the monitoring device sequentially specifying sensor IDs of the tire condition acquisition devices and requesting input of a tire position of each of the tire condition acquisition devices, and generating registration information in which the sensor ID and the tire position are associated based on results of inputting the tire position.

Furthermore, a monitoring device according to the present technology is a monitoring device that receives radio signals related to quantities of tire conditions of a pneumatic tire from a plurality of tire condition acquisition devices and performs predetermined processes, sensor IDs of the tire condition acquisition devices being sequentially specified and input of a tire position of each of the tire condition acquisition devices being requested, and registration information being generated in which the sensor ID and the tire position are associated based on results of inputting the tire position.

With a tire condition monitoring system according to the present technology, a monitoring device requests input of tire positions by sequentially specifying sensor IDs when updating registration information in which sensor IDs and tire positions are associated, such as during a tire rotation, allowing the user to sequentially input the tire positions in accordance with these input requests. This provides the advantage of being able to simplify the operation of updating registration information.

DETAILED DESCRIPTION

The present technology is described below in detail with reference to the accompanying drawings. However, the present technology is not limited to these embodiments. Moreover, constituents which can possibly or obviously be substituted while maintaining consistency with the present technology are included in constitutions of the embodiments. Furthermore, a plurality of modified examples that are described in the embodiment can be freely combined within a scope of obviousness for a person skilled in the art.
[Tire Condition Monitoring System]

Figure 1:
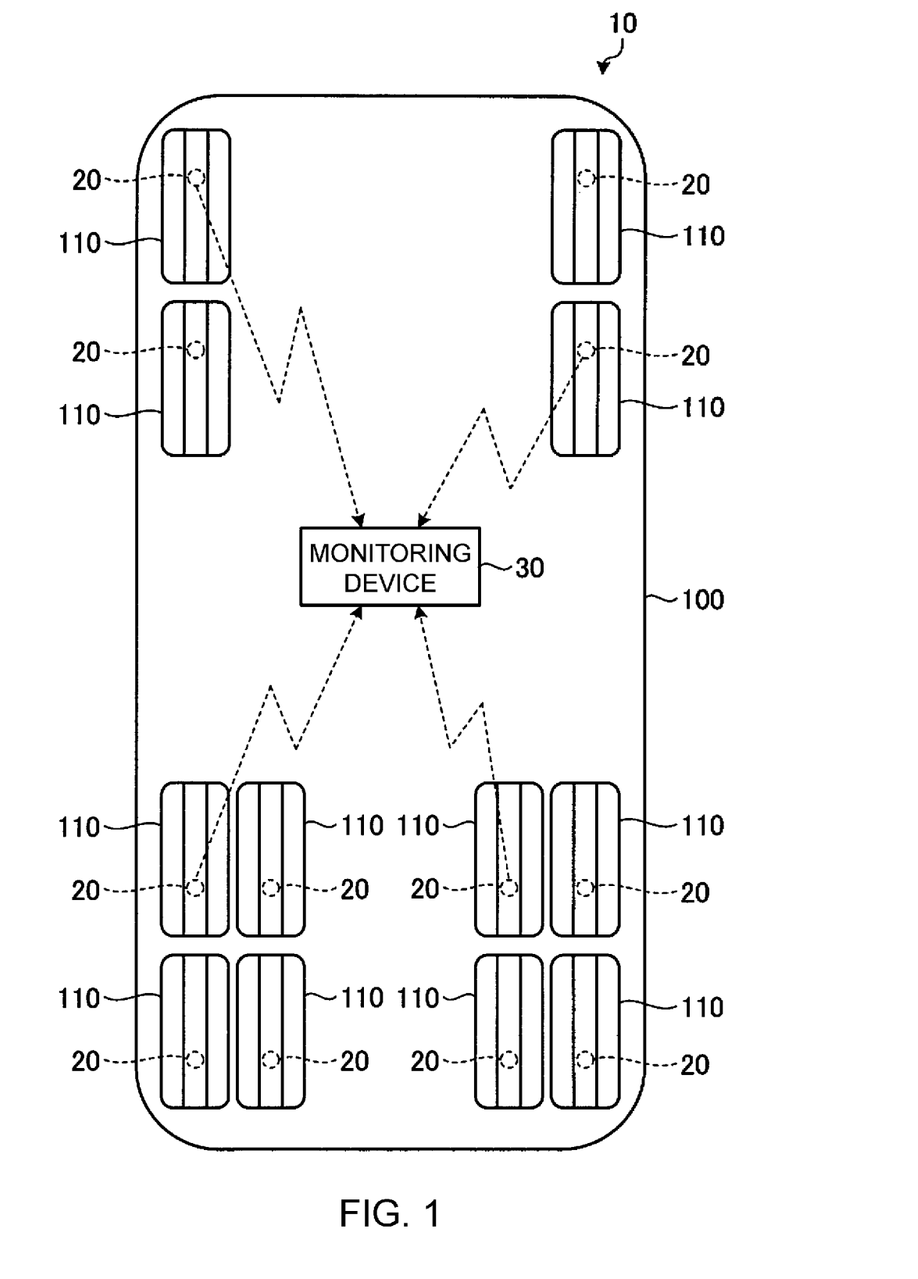
FIG. 1 is a configuration view illustrating a tire condition monitoring system according to an embodiment of the present technology.
Figure 2:
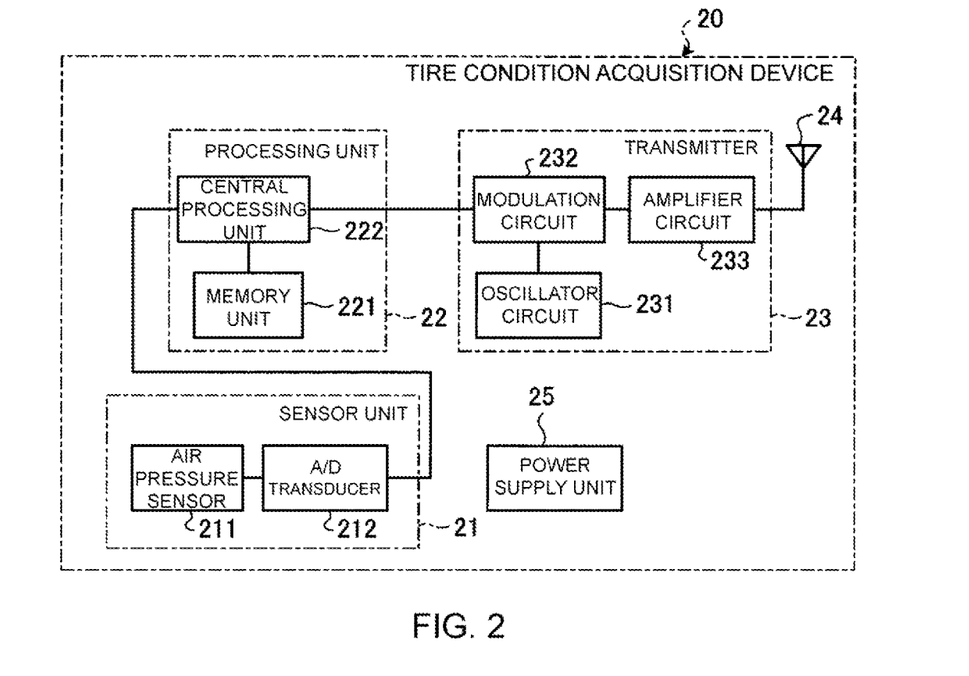
FIG. 2 is a block diagram illustrating a tire condition acquisition device in the tire condition monitoring system illustrated in FIG. 1.
Figure 3:
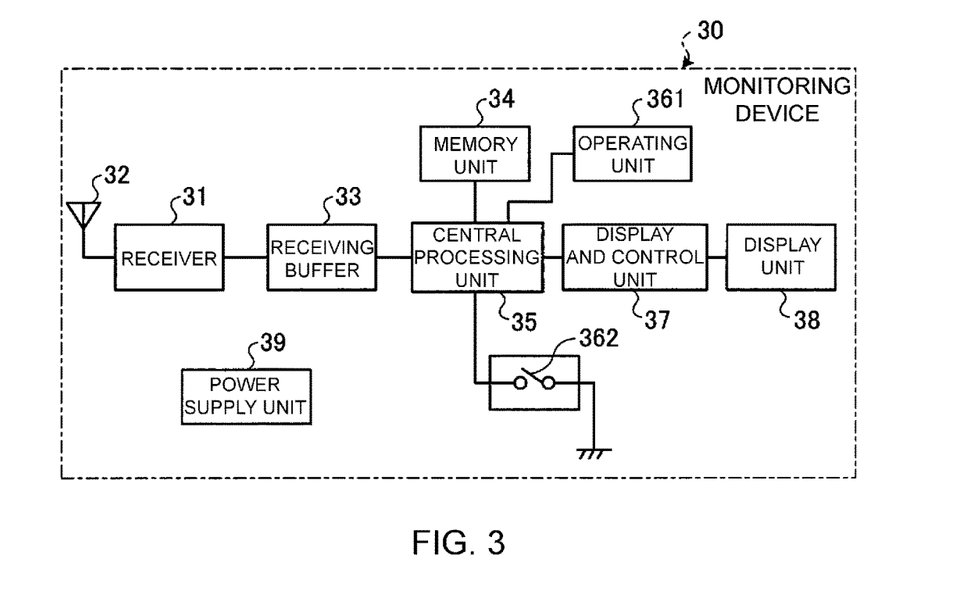
FIG. 3 is a block diagram illustrating a monitoring device in the tire condition monitoring system illustrated in FIG. 1.

FIG. 1 is a configuration view illustrating a tire condition monitoring system according to an embodiment of the present technology. FIG. 2 is a block diagram illustrating a tire condition acquisition device in the tire condition monitoring system illustrated in FIG. 1. FIG. 3 is a block diagram illustrating a monitoring device in the tire condition monitoring system illustrated in FIG. 1.

A tire condition monitoring system 10 is a system which monitors quantities of or values representing tire conditions in a pneumatic tire 110. Examples of tire conditions include tire pressure, temperature, and the like. A time pressure monitoring system (TPMS) which monitors the filled air pressure of the pneumatic tires 110 mounted on a vehicle will be described herein as one example of the tire condition monitoring system 10. Note that in the present embodiment, a vehicle 100 is a 12-wheel vehicle in a 2/2-4D/4D configuration (i.e., two front wheels/two wheels and four back drive wheels/four drive wheels), and the pneumatic tire 110 is mounted on each wheel.

The tire condition monitoring system 10 is provided with tire condition acquisition devices 20 and a monitoring device 30.

The tire condition acquisition device 20 is a device which acquires or detects quantities of tire conditions in the pneumatic tire 110. The tire condition acquisition device 20 includes a sensor unit 21, a processing unit 22, a transmitter 23, an antenna 24, and a power supply unit 25 (see FIG. 2.) The sensor unit 21 includes an air pressure sensor 211 which detects and outputs the air pressure of a tire, and an A/D transducer 212 which subjects the signal output by the air pressure sensor 211 to analog/digital conversion and outputs the resultant signal. The processing unit 22 includes a memory unit 221 which stores predetermined programs, and a central processing unit 222 which generates and outputs predetermined air pressure data based on the signal output by the air pressure sensor 211 by importing and executing a predetermined program from the memory unit 221. A transmitter 23 includes an oscillator circuit 231 which generates a carrier wave signal, a modulation circuit 232 which modulates and outputs the carrier wave signal from the oscillator circuit 231 based on a signal output by the central processing unit 222, and an amplification circuit 233 which amplifies and outputs the signal output by the modulation circuit 232. The antenna 24 is connected to the amplification circuit 233 of the transmitter 23. The power supply unit 25 is a secondary cell, for example, and supplies power to the tire condition acquisition device 20.

The monitoring device 30 is a device which monitors quantities of tire conditions acquired by the tire condition acquisition device 20 and performs predetermined processes. The monitoring device 30 includes a receiver 31, an antenna 32, a receiving buffer 33, a memory unit 34, a central processing unit 35, an operating unit 361, a switch 362, a display controller 37, a display device 38, and a power supply unit 39. The receiver 31 receives a radio signal related to air pressure data (i.e., a quantity of a tire condition) from the tire condition acquisition device 20 via the antenna 32, extracts the air pressure data and identifying information data therefrom, and outputs the air pressure data and the identifying information data. The antenna 32 is connected to the receiver 31. The receiving buffer 33 temporarily stores the air pressure data and the identifying information data from the receiver 31. The memory unit 34 stores predetermined programs, communication system tables for the tire condition acquisition device 20, and so on. The central processing unit 35 performs predetermined processes based on the air pressure data and the identifying information data from the receiving buffer 33 by reading and executing the predetermined programs from the memory unit 34. These processes include, for example, a process that determines abnormalities in tire air pressure, a process that generates a determination result, a process that causes the display device 38 to display the determination result, and so on. The operating unit 361 is an input unit for inputting various types of data into the monitoring device 30. The switch 362 is an on/off switch for turning the monitoring device 30 on. The display controller 37 controls the content of the display device 38 on the basis of signals output by the central processing unit 35. The display device 38 is disposed at the driver's seat of the vehicle 100, for example, displays predetermined contents. The power supply unit 39 is the battery of the vehicle 100, for example, and supplies power to the monitoring device 30.

In this tire condition monitoring system 10, twelve tire condition acquisition devices 20 are installed on the pneumatic tires 110 mounted on the twelve wheels of the vehicle 100, respectively. Each of the tire condition acquisition devices 20 detects the air pressure of one of the pneumatic tires 110 as the quantity of a tire condition. Specifically, the sensor unit 21 detects the air pressure of the tire, the processing unit 22 generates air pressure data based on this detection signal, and the transmitter 23 generates a transmission signal based on the air pressure data and sends the transmission signal to the monitoring device 30 via the antenna 24. The air pressure of each of the pneumatic tires 110 is thus acquired.

The monitoring device 30 also determines abnormalities on the basis of the quantities of the tire conditions acquired from the tire condition acquisition devices 20, displays the determination results, and alerts the driver. Specifically, the central processing unit 35 performs abnormality determinations based on the air pressure data acquired from the tire condition acquisition devices 20. In this case, air pressure of a tire at or below a predetermined threshold, a sudden fall in the air pressure of a tire, and the like are used as determination conditions. The central processing unit 35 displays to the display device 38 information relating to the tire air pressure based on the determination results. At this time, information such as low tire air pressure, flat tires, and so on is displayed in correspondence to the position at which the tire is mounted. The quantities of the tire condition are thus monitored appropriately and the driver is alerted.

Figure 4:
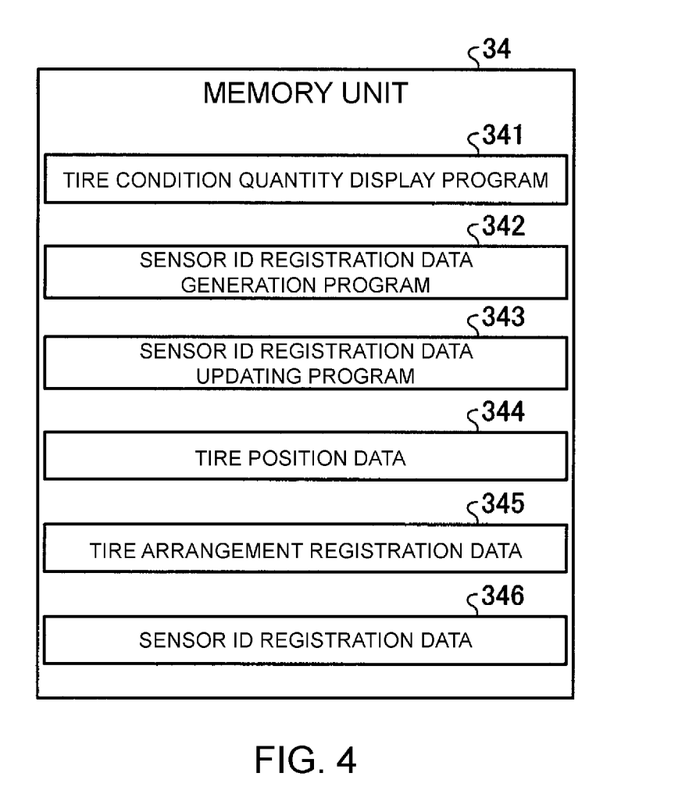
FIG. 4 is a block diagram illustrating a memory unit of the monitoring device illustrated in FIG. 3.

FIG. 4 is a block diagram illustrating the memory unit of the monitoring device illustrated in FIG. 3. FIG. 4 illustrates various programs and some of the data stored in the memory unit 34.

As illustrated in FIG. 4, the memory unit 34 of the monitoring device 30 stores programs 341 to 343 and data 344 to 346. The programs 341 to 343 and the data 344 to 346 include a tire condition quantity display program 341 which individually displays quantities of tire conditions of the pneumatic tires 110 at each tire position of the vehicle 100, a sensor ID registration generation program 342 that generates registration information in which a sensor ID and a tire position are associated, a sensor ID registration data updating program 343 for updating the registration information in which the sensor IDs and the tire positions are associated, tire position data 344 related to tire positions unique to that vehicle, wheel arrangement registration data 345 related to an arrangement of wheels in the vehicle 100, and sensor ID registration data 346 related to the association of the sensor IDs, the tire labels, and tire positions. The programs 341 to 343 and the data 344 and 346 are described later.

[Tire Position]

Figure 5:
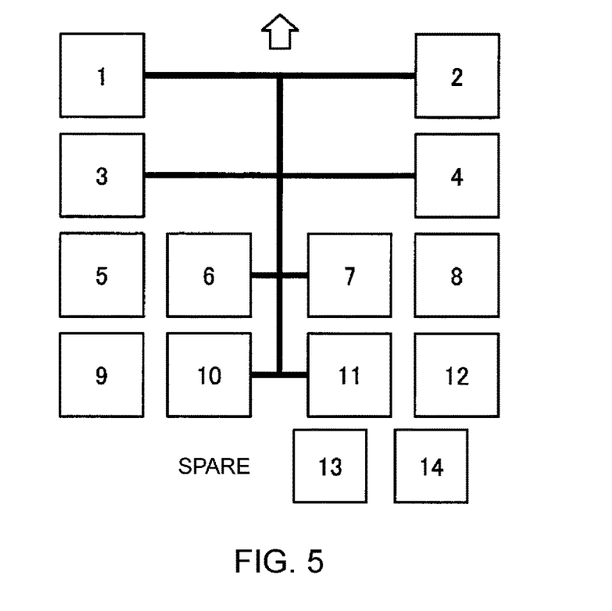
FIG. 5 is a descriptive view illustrating arrangement positions of pneumatic tires in the vehicle illustrated in FIG. 1.

FIG. 5 is a descriptive view illustrating arrangement positions of pneumatic tires in the vehicle illustrated in FIG.

1. FIG. 5 schematically illustrates where the tires are mounted and where the spare tire is stored relative to the wheels of the vehicle 100.

In the vehicle 100 of FIG. 1, there are twelve places the tires are mounted relative to the wheels, as illustrated in FIG. 5, and there are two places where the spare tires are stored. Therefore, there are fourteen places in the vehicle 100 where the pneumatic tires 110 are located. The places where the pneumatic tires 110 are located in the vehicle 100 are referred to as "tire positions." Each tire position is unique information defined according to the wheel arrangement of the vehicle 100 and is stored in the memory unit 34 of the monitoring device 30 as the tire position data 344. Note that in the configuration of FIG. 5, the monitoring device 30 manages the tire positions according to serial numbers from 1 to 14. This is not a limitation, however. The monitoring device 30 may also manage the tire positions according to other characters, symbols, or the like (not shown in the drawings).

[Individual Display of Quantities of Tire Condition]

Figure 6:
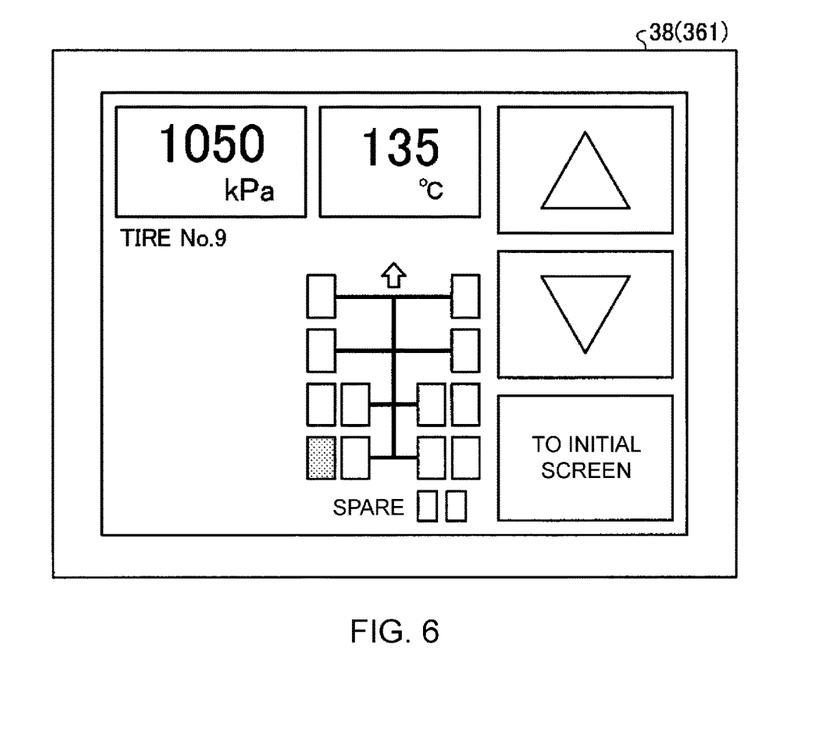
FIG. 6 is a descriptive view illustrating a display screen of a display unit of the monitoring device illustrated in FIG. 3.

FIG. 6 is a descriptive view illustrating a display screen of a display unit of the monitoring device illustrated in FIG. 3. FIG. 6 illustrates a display screen with the filled air pressure and the temperature of the 9th tire position illustrated in FIG. 5.

In the tire condition monitoring system 10, as illustrated in FIG. 6, the monitoring device 30 can individually display the quantities of the tire conditions (filled air pressure and temperature) of the pneumatic tire 110 at each tire position in FIG. 5 in the display device 38. This display is realized by the central processing unit 35 of the monitoring device 30 reading and executing the tire condition quantity display program 341 from the memory unit 34.

For example, during ordinary times, the monitoring device 30 determines abnormalities on the basis of the quantities of the tire conditions acquired from the tire condition acquisition devices 20, displays the determination results to the initial screen (not shown in the drawings) of the display device 38, and alerts the driver. The initial screen displays a single flashing lamp which alerts the driver only to the presence of an abnormality. When an abnormality occurs, the user operates the operating unit 361 of the monitoring device 30 to switch the display screen of the display device 38 from the initial display to the display screen of FIG. 6. The user can sequentially check the quantities of the tire conditions of each of the pneumatic tires 110 by switching the tire position to be displayed by operating the operating unit 361.

Note that in the configuration illustrated in FIG. 6, the display device 38 of the monitoring device 30 is a touch panel, and doubles as the operating unit 361. This display screen also displays up and down buttons for switching among the tire positions to be displayed and a button for returning to the initial screen. The user can operate these buttons by touching them to switch the displayed screen in the display device 38.

However, this is not a limitation. It is also possible to constitute the display device 38 of the monitoring device 30 and the operating unit 361 as separate units. For example, it is also possible for the display device 38 to be a dedicated monitor and the operating unit 361 to be a wireless or wired button-type controller.

The display device 38 (and the operating unit 361) may also be such that the monitoring device 30 has a dedicated monitor or doubles as a vehicle monitor mounted in the vehicle 100, for example.

[Registration of Wheel Arrangement of Vehicle]

Figure 7:
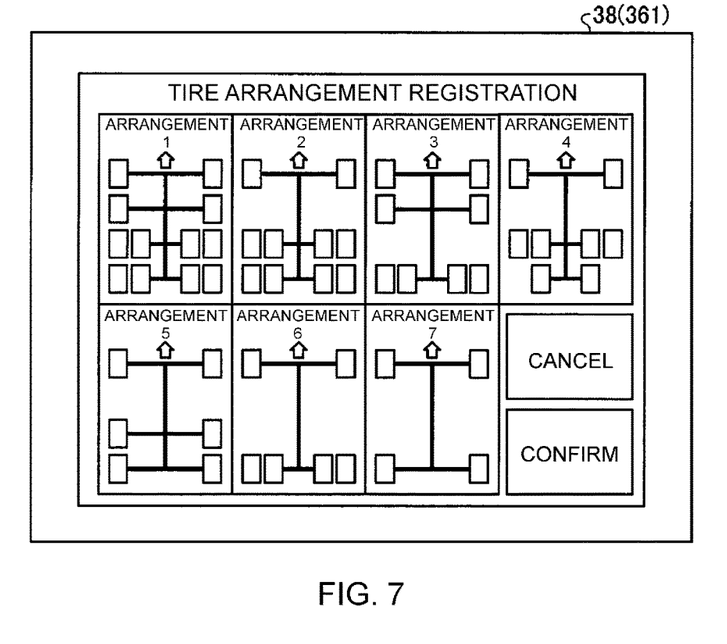
FIG. 7 is a descriptive view illustrating a display screen of a display unit of the monitoring device illustrated in FIG. 3.

FIG. 7 is a descriptive view illustrating a display screen of a display unit of the monitoring device illustrated in FIG. 3. FIG. 7 illustrates a registration screen for wheel arrangement.

With the tire condition monitoring system 10, as illustrated in FIG. 7, registration of the wheel arrangement of the vehicle 100 can be done from the display screen of the display device 38 (the operating unit 361).

For example, with the constitution of FIG. 7, a wheel arrangement 1 of two front wheels, two wheels-four back wheels, and four back wheels, a wheel arrangement 2 of two front wheels, four back wheels, and four back wheels, a wheel arrangement 3 of two front wheels and two wheels-four back wheels, a wheel arrangement 4 of two front wheels, four back wheels, and two wheels, a wheel arrangement 5 of two front wheels-two back wheels, and two back wheels, a wheel arrangement 6 of two front wheels and four back wheels, and a wheel arrangement 7 of two front wheels and two back wheels are displayed using selection buttons. The user can register the wheel arrangement of the vehicle 100 by touching the selection buttons to select the wheel arrangement of the vehicle 100 and then touching the confirmation button. The registration information of the wheel arrangement is stored in the memory unit 34 of the monitoring device 30 as the wheel arrangement registration data 345.

[Sensor IDs and Tire Labels]

Figure 8:
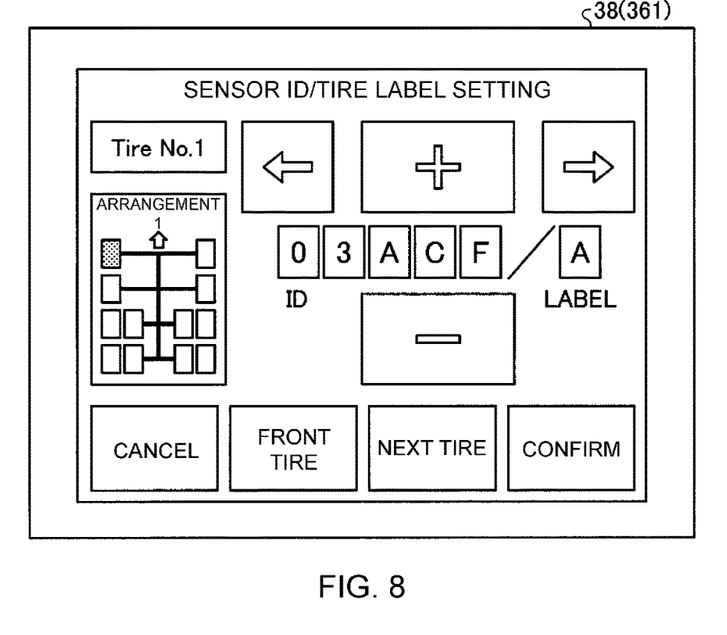
FIG. 8 is a descriptive view illustrating a display screen of a display unit of the monitoring device illustrated in FIG. 3.

FIG. 8 is a descriptive view illustrating a display screen of a display unit of the monitoring device illustrated in FIG. 3. FIG. 8 illustrates a setting screen for sensor IDs and tire labels.

With the tire condition monitoring system 10, sensor IDs and tire labels are used as unique identifying information of the tire condition acquisition devices 20. The tire positions of the vehicle 100 are registered in a one-to-one association with the sensor IDs and the tire labels.

The sensor IDs are identifying information assigned to each of the tire condition acquisition devices 20 and are expressed as multi-digit character strings (e.g., five-digit hexadecimal). The tire condition acquisition devices 20 output signals related to obtained quantities of tire conditions together with signals relating to the sensor IDs and transmit the quantities of the tire conditions to the monitoring device 30. The monitoring device 30 uses the sensor IDs to identify which of the tire condition acquisition devices 20 in which tire position the received radio signal is from. Note that the sensor IDs are printed on a sticker and applied to the case of the tire condition acquisition device 20.

The tire labels are a simplified indication of the sensor IDs and are set uniquely in a one-to-one association with each sensor ID. The tire labels are made up of fewer-digit (preferably, one-digit) characters than the sensor ID, figures, symbols, or combinations thereof. The tire labels are used in a predetermined order N when tire position input requests, discussed below, are made, and therefore it is preferable that they be continuous characters or character strings made up of sequential letters or numbers, for example. By managing the sensor IDs using the tire labels, the updating and registration of the sensor IDs, discussed below, is easier than when using the multi-digit sensor IDs as-is. Note that the tire labels are printed all together on one sticker together with the sensor IDs and attached to the rim of the pneumatic tire 110.

As illustrated in FIG. 8, setting the sensor ID and the tire label is done from the display screen in the display device 38 (the operating unit 361). Association of the sensor ID, the tire label, and the tire position is done by the central processing unit 35 of the monitoring device 30 reading the sensor ID registration generation program 342 from the memory unit 34 and executing it.

Specifically, first the monitoring device 30 requests input of the sensor ID and the tire label for each of the tire condition acquisition devices 20 arranged in the tire positions (see FIG. 5) of the vehicle 100. In this case, the monitoring device 30 displays the tire position numbers (see FIG. 5) and a graphic of the wheel arrangement to the display screen of the display device 38.

In response, the user touches the display screen to sequentially enter the sensor ID and the tire label corresponding to each tire position in the display screen. At this time, in the input field of the sensor ID and the tire label, the cursor position is moved by touching the left and right arrow buttons illustrated in FIG. 8, and the input value can be changed by touching the ±button. The tire position to be registered can be selected by touching the tire buttons and the next button at the bottom in FIG. 8. Input can be confirmed or canceled by touching the confirm and cancel buttons.

Next, the monitoring device 30 generates the sensor ID registration data 346 in which the sensor ID, the tire position, and the tire position are associated in a one-to-one manner based on the information input in the display screen. The monitoring device 30 stores the sensor ID registration data 346 in the memory unit 34.

The setting of the sensor ID and the tire label are done, when initially registering, e.g., when deploying the tire condition monitoring system 10 or when replacing the tire condition acquisition devices 20.

Note that in the present embodiment, fourteen characters, the letters A through N, are used as the tire labels. These tire labels are assigned in a one-to-one manner to the sensor IDs of the tire condition acquisition devices 20. Moreover, the sensor IDs of the tire condition acquisition devices 20 having the tire labels A through N and the 1st through 14th tire positions (see FIG. 5) are associated in a one-to-one manner in alphabetical order and stored in the memory unit 34 of the monitoring device 30 as the sensor ID registration data 346.

[Updating Sensor ID Registration Data]

For example, during tire rotation, the tire condition acquisition device 20 moves together with the pneumatic tire 110. Therefore, the registration information (the sensor ID registration data 346) in which the sensor ID of the tire condition acquisition device 20 and the tire position are associated has to be updated. It is, therefore, preferable to be able to easily update the registered information.

Accordingly, with the tire condition monitoring system 10, the following constitution is adopted when updating registration of the sensor ID registration data during tire rotation.

Figure 11C:
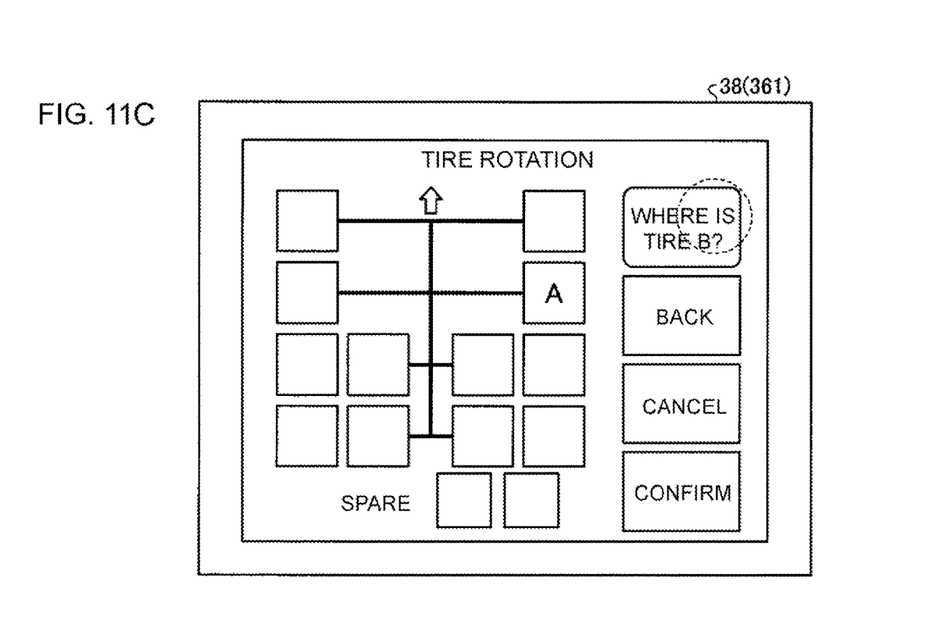
FIGS. 11C and 11D are descriptive views illustrating a method for updating and registering sensor IDs during a tire rotation.
Figure 11D:
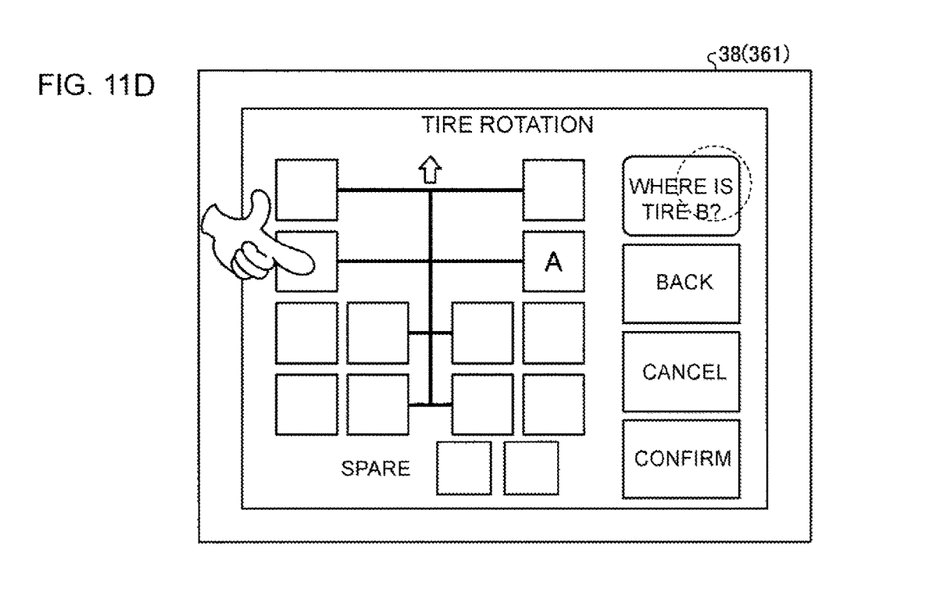
Figure 12E:
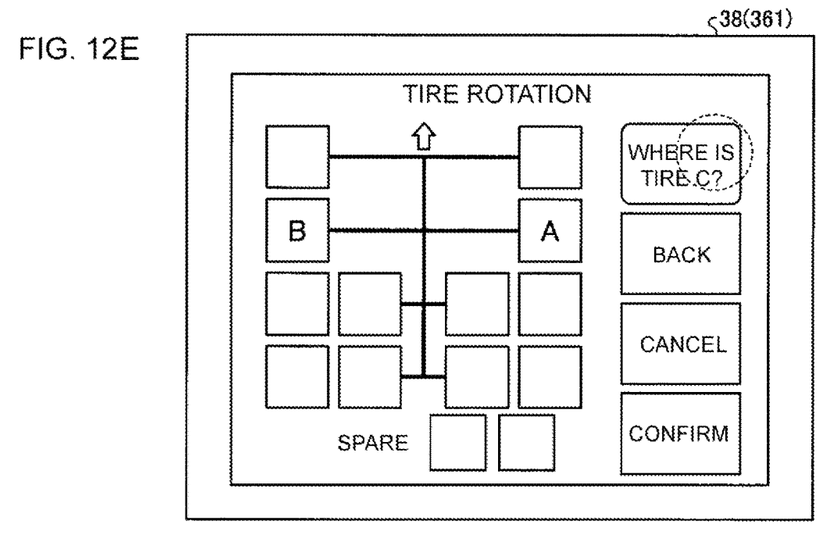
FIGS. 12E and 12F are descriptive views illustrating a method for updating and registering sensor IDs during a tire rotation.
Figure 12F:
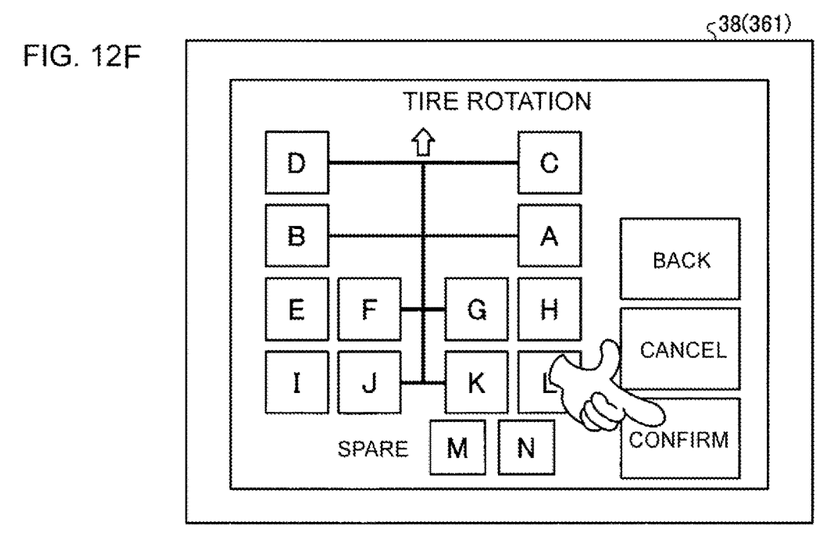
Figure 13:
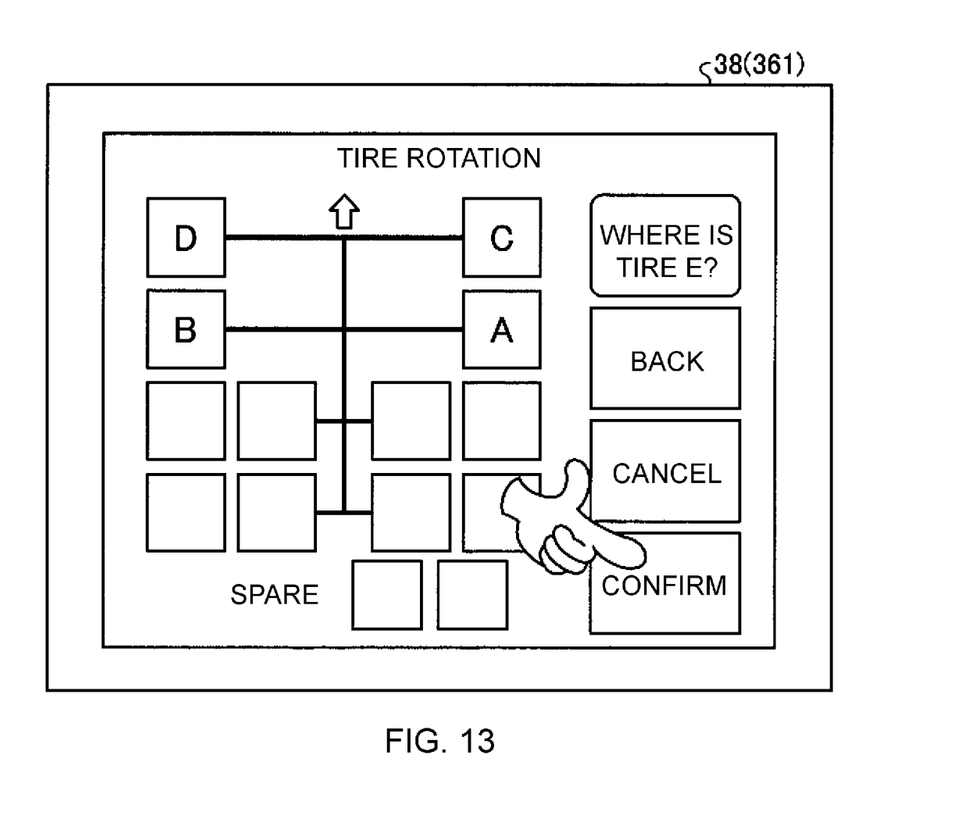
FIG. 13 is a descriptive view illustrating a method for updating and registering sensor IDs during a tire rotation.

FIGS. 9 through 13 are a flowchart (FIG. 9) and descriptive views (FIGS. 10A to 13) illustrating a method for updating and registering sensor IDs during tire rotation. In these drawings, FIGS. 10A to 13 illustrate display screens of the display device 38 when updating and registering the sensor ID registration data 386. FIGS. 10A to 12A to 12F illustrate a case in which the user manually inputs the tire labels up to the last one, N, and FIG. 13 illustrates a case in which only some of the tire labels, A to D, are input and then the confirmation button is pressed.

In this case, as one example, a case is described in which four of the pneumatic tires 110 which are in the 1st through 4th tire positions in FIG. 5 are rotated in the manner illustrated in FIG. 12F from the way they were when originally registered.

Note that, as described above, each one of the tire condition acquisition devices 20 is installed in each one of the pneumatic tires 110. During tire rotation, the pneumatic tire 110 and the tire condition acquisition device 20 move as a set to the same tire position. Accordingly, in the present embodiment, the pneumatic tire 110 having the tire condition acquisition device 20 with the sensor ID of the tire label A (or B through N) is simply referred to as the pneumatic tire 110 of the tire label A (or B through N).

In the state at the time of the original registration, the sensor ID of the tire label A is assigned to the 1st tire position illustrated in FIG. 5, the sensor ID of the tire label B is assigned to the 2nd tire position, and the sensor IDs of the tire labels C through N are assigned in alphabetic order to the 3rd through the 14th tire positions (not shown in the drawings).

Note that the relationship between the tire labels A through N and the tire positions during original registration (before updating the registration) are listed in a management sheet and stored in the driver's seat or recorded in a data file and stored in a portable data terminal.

In a case in which the updated registration of the sensor ID registration data 346 is done during tire rotation, the user touches and selects the "tire rotation" option in the settings menu (not shown in the drawings) in the initial screen of the display device 38. When the monitoring device 30 (the central processing unit 35) senses this touch operation, the monitoring device 30 reads and executes the sensor ID registration data updating program 343 from the memory unit 34 and initiates the updating and registration process of the sensor ID registration data 346.

The updating and registration process for the sensor ID registration data 346 by the monitoring device 30 is described below, with reference to the flowchart in FIG. 9.

In step ST1, the monitoring device 30 designates the pneumatic tire 110 having the N=1 tire label and requests input of the tire position. This tire position input request is done, for example, by displaying to the display screen of the display device 38, by voice guidance through a speaker (not shown in the drawings), or the like.

The tire position input request is an input request about which tire position the pneumatic tire 110 having the specified tire label was put in. This input request is done irrespective of whether or not the pneumatic tire 110 having the specified tire label was moved during the tire rotation.

Figure 9:
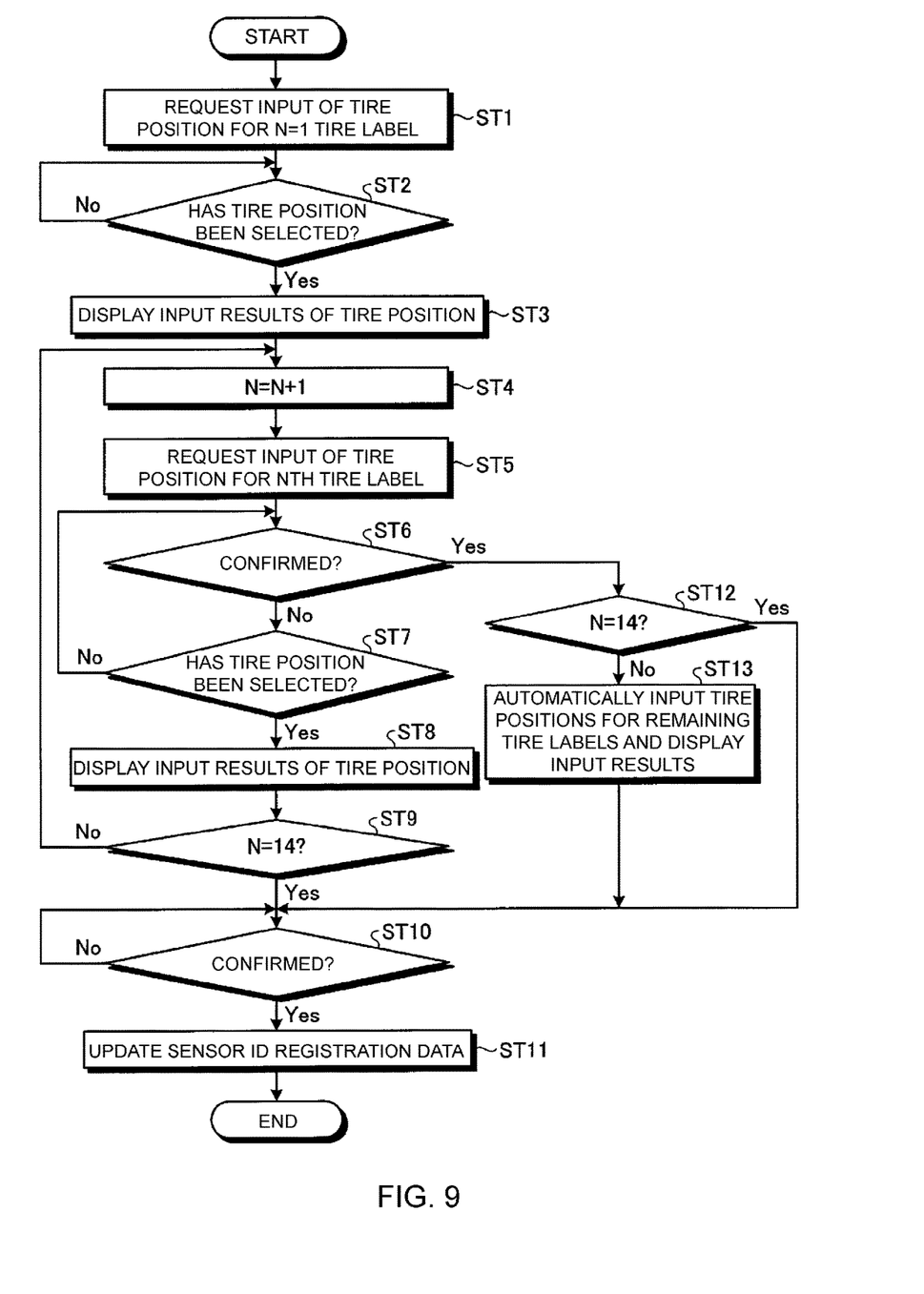
FIG. 9 is a flow chart illustrating a method for updating and registering sensor IDs during a tire rotation.

The order N of the tire label is used as appropriate in the flowchart of FIG. 9 to indicate the order of specification of the tire labels during a tire position input request. With the tire condition monitoring system 10, as described below, the monitoring device 30 specifies fourteen pneumatic tires 110 having the tire labels A through N in alphabetical order and requests input of the tire position of each. The specification order of the tire label A is therefore N=1.

Figure 10A:
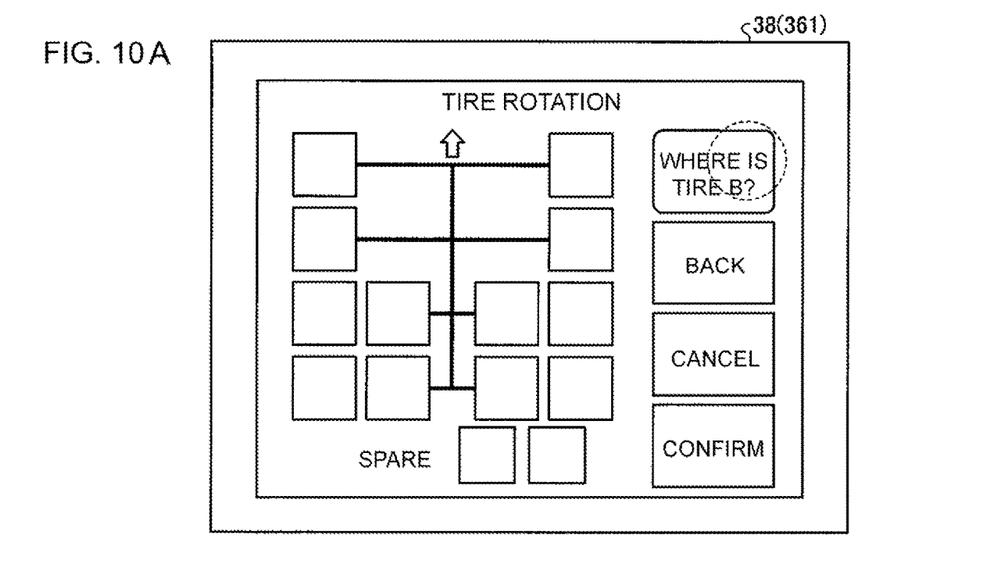
FIGS. 10A and 10B are descriptive views illustrating a method for updating and registering sensor IDs during a tire rotation.

For example, in the constitution of FIG. 10A, the display screen displays a dialog box, a plurality of tire position buttons, a back button, a cancel button, and a confirm button.

The dialog box displays a dialog illustrating the tire position input request. In the display screen of FIG. 10A, the dialog box displays "Where is tire A?" thereby asking the user which tire position the pneumatic tire 110 having the tire label A has been moved to. "Tire A" means "tire label A" and "where" means the tire position. Note that the display of the display box requires that the user easily be able to understand that it is requesting input of the tire position, but can otherwise be modified.

The plurality of tire position buttons are buttons for selecting the tire positions, and are arranged corresponding to the tire positions (see FIG. 5) of the vehicle 100. The user can select the tire position by touching any one of the tire position buttons. In the display screen of FIG. 10A, the plurality of tire display buttons indicate the 1st through the 14th tire positions of the vehicle 100, and are arranged so as to allow visual grasping of the wheel arrangement and the arrangement of the spare tires in the vehicle 100. Note that the arrangement of these tire position buttons can be modified as appropriate.

The back button is for canceling the immediately preceding input operation and returning to the previous screen. When the back button is touched, the monitoring device 30 returns the display screen of the display device 38 to the previous screen. In the flowchart in FIG. 9, processes for what happens when the back button is touched are omitted.

The cancel button is a button which cancels the updating and registration of the sensor ID registration data 386. When the cancel button is touched, the monitoring device 30 returns the display screen of the display device 38 to the initial screen. In the flowchart in FIG. 9, processes for what happens when the cancel button is touched are omitted.

The confirm button is a button for confirming a series of tire position input operations. Operation of the confirm button is discussed later.

After step ST1, the process moves to step ST2.

In step ST2, the monitoring device 30 makes a determination as to whether or not selection input of a tire position has been made. Selection input of a tire position is done through the operating unit 361.

Figure 10B:
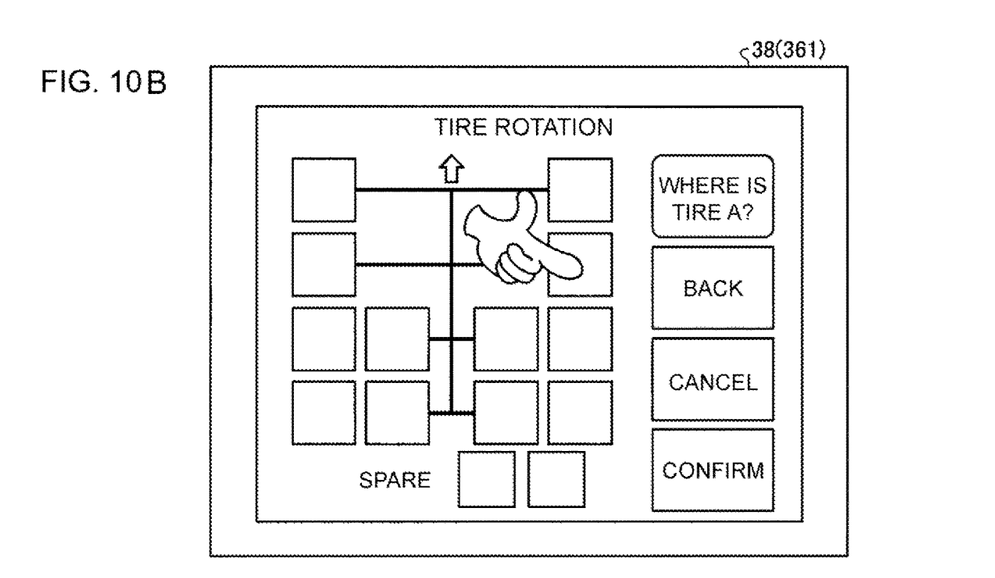

For example, in the constitution of FIG. 10B, the display device 38 is a touch panel and doubles as the operating unit 361. Therefore, the user selects the tire position button displayed in the display device 38 by touching it, thereby being able to select the desired tire position. In response to a tire position input request displayed in the dialog box, the user inputs the new tire position of the corresponding pneumatic tire 110. Here, the dialog box displays "Where is tire A?" so the user selects from among the tire position buttons and touches the tire position (the 4th tire position in FIG. 5) of the pneumatic tire 110 with the tire label A after rotation. When this is done, the 1st through the 14th tire positions of the vehicle 100 are arranged according to the wheel arrangement and the arrangement of the spare tires in the vehicle 100, so the input operation by the user is easy. Note that in FIG. 10B, the user's hand performing a touch operation is illustrated.

In step ST2, in a case in which an affirmative determination is made (i.e., selection input of a tire position was made), the process moves to step ST3, but if a negative determination is made, step ST2 is repeated.

In step ST3, the monitoring device 30 displays the input result of the tire position input in step ST2 to the display screen of the display device 38. For example, in the constitution of FIG. 11C, the input result associated with the tire position of the pneumatic tire 110 having the tire label A is displayed to the tire display button which was touched. When this is done, the 1st through the 14th tire positions of the vehicle 100 are arranged according to the wheel arrangement and the arrangement of the spare tires in the vehicle 100, so the user can easily and visually grasp the input result of the tire position from the display screen. After step ST3, the process moves to step ST4.

In step ST4, the monitoring device 30 increments the number N of the tire label related to the tire position input request, making it N=N+1. After step ST4, the process moves to step ST5.

In step ST5, a tire position input request is made for the pneumatic tire 110 having the Nth tire label. For example, in the constitution of FIG. 11C, the monitoring device 30 designates the tire label B (N=2) following the tire label A (N=1) designated in step ST1 to request input of the tire position (see the area enclosed by the dotted line in FIG. 11C). After step ST5, the process moves to step ST6.

In step ST6, the monitoring device 30 makes a determination as to whether or not a confirmation operation was performed for confirming all the input operations until that moment. This confirmation operation is done by the user touching the confirmation button displayed to the display screen. If an affirmative determination is made in step ST6, the process moves to step ST12, but if a negative determination is made, the process moves to step ST7.

In step ST7, the monitoring device 30 makes a determination as to whether or not a selection input for the tire position having the Nth tire label for which input was request in step ST5 was made. For example, in the constitution of FIG. 11D, the monitoring device 30 displays "Where is tire B?" in the dialog box to request input of the tire position for tire label B, or N=2. In response, the user selects from the among the plurality of tire position buttons to touch the tire position (the 3rd tire position in FIG. 5) of the pneumatic tire 110 having the tire label B after rotation. In step ST7, in a case in which an affirmative determination is made (i.e., selection input of a tire position was made), the process moves to step ST8, but if a negative determination is made, step ST6 is returned to.

In step ST8, the monitoring device 30 displays the input result of the tire position input in step ST7 to the display screen of the display device 38. For example, in the constitution of FIG. 12E, the input result associated with the tire position of the pneumatic tire 110 having the tire label B is displayed to the tire display button which was touched. After step ST8, the process moves to step ST9.

In step ST9, the monitoring device 30 determines whether or not N=14. In other words, a determination is made as to whether or not the tire position input request was made for the 14th, or last, tire label N. If an affirmative determination is made in step ST9, the process moves to step ST10. On the other hand, if a negative determination is made, the process returns to step ST4, where the monitoring device 30 sequentially specifies the remaining tire labels and displays tire position input requests (steps ST4 to ST5), and displays the input results according to the input operations for the tire positions (affirmative determination in step ST7, and step ST8).

Note that in the constitution of FIG. 12E, the tire label C, or N=3, is specified, and the tire position input request is made. Thereafter, if the user manually enters all the tire labels A through N, steps ST4 through ST8 are repeated until N=14 (affirmative determination at step ST9). On the other hand, if the user touches the confirmation button while inputting (affirmative determination in step ST6), the process moves to step ST12 and the automatic input process for tire labels described below is performed.

In step ST10, the monitoring device 30 makes a determination as to whether or not a confirmation operation confirming the input operations up till that moment was made after the tire position input operations were made for all the tire labels A through N (affirmative determination in step ST9). This confirmation operation is done by the user touching the confirmation button displayed to the display screen. If an affirmative determination is made in step ST10, the process moves to step ST11, but if a negative determination is made, the process repeats ST10.

For example, in the constitution of FIG. 12F, the input operations for the tire positions having all tire labels A through N are complete (affirmative determination in step ST9), and the tire position boxes corresponding to the tire labels A through N are all displayed. Furthermore, the monitoring device 30 is in standby mode, waiting for the user to perform a confirmation operation.

In step ST11, the monitoring device 30 updates the sensor ID registration data 346 based on the input results of the tire positions. For example, in the constitution of FIG. 12F, the user checks the tire positions having labels A to N displayed in the tire position boxes and thereafter confirms the input operations for the tire positions by touching the confirmation button. Once that happens, the monitoring device 30 updates the sensor ID registration data 346 based on the input results of the tire positions and stores this in the memory unit 34. Thereafter, the monitoring device 30 completes the series of processes related to updating and registration of the sensor ID registration data 346 and returns the display screen of the display device 38 to the initial screen.

In step ST12, the monitoring device 30 determines whether or not N=14. In other words, a determination is made as to whether or not the tire position input request was made for all the tire labels A to N. If an affirmative determination is made in step ST12, the process moves to step ST10, but if a negative determination is made, the process moves to step ST13.

In step ST13, if the confirmation operation is done before completion of the input operations for the tire positions of all the tire labels A through N (affirmative determination in step ST6 and negative determination in step ST12), the monitoring device 30 automatically inputs the tire positions for the remaining tire labels and displays the input results to the display screen. When this happens, the monitoring device 30 uses the sensor ID registration data 346 from before updating and registration to automatically input the tire positions for the remaining tire labels. After step ST13, the process moves to step ST10.

For example, in the constitution of FIG. 13, the tire positions have been input for all of the pneumatic tires 110 having the tire labels A through D which have been rotated and the input results are displayed to the tire position boxes. The dialog box displays "Where is tire E?" and thereby requests input of the tire position for the tire label E. However, the pneumatic tires 110 having the remaining tire labels E through N have not been rotated, so their tire positions have not changed. Accordingly, the user presses the confirmation button after entering the tire positions for the tire labels A through D, making it possible to automatically input the tire positions for the remaining tire labels E through N. The display screen in FIG. 12F is displayed, and the tire positions for the remaining tire labels E through N are automatically displayed to the display screen. The burden of input by the user is thereby reduced.

Note that when only some of the pneumatic tires 110, i.e., those with the tire labels A to D, are replaced and the tire positions are entered, if the confirmation button is pressed with only A and B entered, as illustrated in FIG. 12E, the input positions for the remaining tire labels C and D are unknown, so the automatic input of step ST13 cannot be carried out. Accordingly, if that happens, the monitoring device 3 does not move to the processes in step ST12 and ST13, but remains in the display screen of FIG. 12E, and maintains its standby state, waiting for the confirmation operation (step ST6) (this part of the flowchart is omitted from FIG. 9).

[Effect]

As described above, the tire condition monitoring system 10 includes the tire condition acquisition devices 20 that are installed on the pneumatic tires 110 and acquire quantities of tire conditions, and the monitoring device 30 that receives a radio signal from a plurality of the tire condition acquisition devices 20 and performs a predetermined process (see FIGS. 1 to 3). The monitoring device 30 sequentially specifies the sensor IDs (or the tire labels described below) of the tire condition acquisition devices 20 and requests input of the tire positions of the tire condition acquisition devices 20 (see step ST1 and step ST5 in FIG. 9, FIGS. 10A, 11C, and 12E). Furthermore, the monitoring device 30 generates registration information in which the sensor ID and the tire position are associated based on the input results of the tire position (step ST11).

The monitoring device 30 receives from the tire condition acquisition devices 20 radio signals relating to the quantities of the tire conditions of the pneumatic tires 110 and performs predetermined processes. The monitoring device 30 sequentially specifies the sensor IDs (or the tire labels described below) of the tire condition acquisition devices 20 and requests input of the tire positions of the tire condition acquisition devices 20 (see step ST1 and step ST5 in FIG. 9, FIGS. 10A, 11C, and 12E). Furthermore, the monitoring device 30 generates registration information in which the sensor ID and the tire position are associated based on the input results of the tire position (step ST11).

With this constitution, the monitoring device 30 requests input of tire positions by sequentially specifying sensor IDs when updating registration information (the sensor ID registration data 346) in which the sensor IDs and tire positions are associated, such as during a tire rotation, allowing the user to sequentially input the tire positions in accordance with these input requests. This provides the advantage of being able to simplify the process of updating registration information.

Furthermore, with the tire condition monitoring system 10, the monitoring device 30 stores the sensor IDs (see FIG. 8) made up of a multi-digit character strings and simplified tire labels corresponding to those sensor IDs in a one-to-one association (as the sensor ID registration data 346). When requesting input of tire positions, the monitoring device 30 sequentially specifies the tire labels and requests input of the tire positions (see step ST1 and step ST5, FIGS. 10A, 11C, and 12E). With this constitution, the user can input tire positions according to the input requests using the simplified tire labels. This provides the advantage of increased efficiency in inputting.

Furthermore, with the tire condition monitoring system 10, if the tire positions for only those sensor IDs which are needed (all of the tire labels A through D which were rotated) are input in response to a tire position input request (affirmative determination in step ST6 and negative determination in step ST12), the monitoring device 30 uses the existing registration information (the sensor ID registration data 346 from before updating) to generate registration information for the tire positions for the other sensor IDs (steps ST13 and ST11). With this constitution, the tire position input request for sensor IDs whose tire position has not changed can be omitted. This provides the advantage of increased efficiency in inputting.

With the tire condition monitoring system 10, the monitoring device 30 includes the display device 38 that displays specification of sensor IDs, tire position input requests, and the input results of the tire position (e.g., FIG. 11C). The user can perform the input process while looking at the display device 38, which has the advantage of increasing the efficiency of input operations.

With the tire condition monitoring system 10, the monitoring device 30 displays to the display device 38 tire position buttons arranged according to the wheel arrangement of the vehicle 100, and displays the input results of the tire positions to the tire position buttons (see FIG. 12F, for example). With this constitution, the user can input while checking the relationship between the wheel arrangement of the vehicle 100 and the tire positions, which has the advantage of increasing efficiency of input operations.

With the tire condition monitoring system 10, the display device 38 (361) is a touch panel that allows touch operation of tire positions (see FIG. 10B, for example). This constitution has the advantage of increasing efficiency of input operations compared to if the operating unit 361 of the monitoring device 30 were a button-type controller.

With the tire condition monitoring system 10, the monitoring device 30 displays to the display device 38 tire position buttons arranged according to the wheel arrangement of the vehicle 100, and senses input operations of the tire positions through touch operations of the tire position buttons (see FIG. 10B, for example). This provides the advantage of increased efficiency in inputting.

[Target of Application]

It is preferable for the tire condition monitoring system 10 to be mounted in a vehicle 100 having six or more wheels. Techniques have already been realized for updating registration information by automatically detecting tire positions in tire condition monitoring systems for conventional four-wheeled vehicles, when the tire positions of the tire condition acquisition devices are moved because of a tire rotation (auto-rotation technology). However, with a vehicle having six or more wheels or any wheel arrangement with multiple wheels in particular, it is difficult to automatically detect the tire position of the tire condition acquisition devices, making it impossible to use this existing auto-rotation technology. Therefore, when moving the tire positions of the tire condition acquisition devices, the registration information has to be updated every time. Therefore, with the tire condition monitoring system 10, this updating operation for registration information can be simplified, making it particularly useful when applied to the vehicle 100 which has six or more wheels.

What is claimed is:

1. A tire condition monitoring system comprising:
a plurality of tire condition acquisition devices that are installed on pneumatic tires and acquire tire condition quantities; and
a monitoring device that receives a radio signal from each of the tire condition acquisition devices and performs a predetermined process;
the monitoring device
storing sensor IDs of the tire acquisition devices, each sensor ID being composed of a multi-digit character string and a simplified tire label corresponding to the sensor ID,
sequentially specifying the sensor IDs of the tire condition acquisition devices and requesting input of a tire position of each of the tire condition acquisition devices by sequentially specifying the tire labels upon requesting input of the tire position, and generating registration information in which the sensor ID and the tire position are associated based on results of inputting the tire position.

2. The tire condition monitoring system according to claim 1, wherein, upon the tire positions for those of the sensor IDs which are needed being input in response to an input request for tire positions and a confirmation operation being performed,
the monitoring device uses the registration information that is already in existence to generate registration information for the tire positions for others of the sensor IDs.

3. The tire condition monitoring system according to claim 2, wherein the monitoring system comprises a display unit that displays specification of the sensor IDs and input requests for the tire positions, and input results of the tire positions.

4. The tire condition monitoring system according to claim 3, wherein the monitoring system displays to the display unit a plurality of tire position buttons arranged in accordance with an arrangement of tires in a vehicle, and displays input results of the tire positions to the tire position buttons.

5. The tire condition monitoring system according to claim 4, wherein the display unit is a touch panel that can be operated to input the tire positions.

6. The tire condition monitoring system according to claim 3, wherein the display unit is a touch panel that can be operated to input the tire positions.

7. The tire condition monitoring system according to claim 1, wherein the monitoring system comprises a display unit that displays specification of the sensor IDs and input requests for the tire positions, and input results of the tire positions.

8. The tire condition monitoring system according to claim 7, wherein the monitoring system displays to the display unit a plurality of tire position buttons arranged in accordance with an arrangement of tires in a vehicle, and displays input results of the tire positions to the tire position buttons.

9. The tire condition monitoring system according to claim 8, wherein the display unit is a touch panel that can be operated to input the tire positions.

10. The tire condition monitoring system according to claim 7, wherein the display unit is a touch panel that can be operated to input the tire positions.

11. The tire condition monitoring system according to claim 10, wherein the monitoring system displays to the display unit a plurality of tire position buttons arranged in accordance with an arrangement of tires in a vehicle, and senses touch operations of the tire position buttons as input operations of the tire positions.

12. The tire condition monitoring system according to claim 1, wherein the tire condition monitoring system is mounted on a vehicle having six or more wheels.

13. A monitoring device that receives radio signals related to tire condition quantities of a pneumatic tire from a plurality of tire condition acquisition devices and performs predetermined processes,
sensor IDs of the tire condition acquisition devices being stored and sequentially specified, and input of a tire position of each of the tire condition acquisition devices being requested, each sensor ID being composed of a multi-digit character string and a simplified tire label corresponding to the sensor ID, and registration information being generated in which the sensor ID and the tire position are associated based on results of inputting the tire position by sequentially specifying the tire labels.

14. A monitoring method, comprising:
receiving radio signals related to tire condition quantities of six or more pneumatic tires from tire condition acquisition devices, each of the pneumatic tires being associated with a tire acquisition device,
sequentially identifying a sensor ID of each of the tire condition acquisition devices, each of the sensor IDs comprising a multi-digit character string,
sequentially identifying, in a predetermined order, a tire label for each of the tire acquisition devices, the tire labels being simplified sensor ID indicators comprising fewer characters than the sensor IDs, sequential tire labels comprising sequential letters or numbers,
requesting manual input of a tire position of each of the tire condition acquisition devices, and
generating registration information associating the sensor ID, the tire label, and the tire position for each of the tire acquisition devices based on the input.

* * * * *